(12) United States Patent
Wu et al.

(10) Patent No.: US 12,169,966 B2
(45) Date of Patent: Dec. 17, 2024

(54) METHOD FOR OPTIMIZING DETECTION OF ABNORMALITIES IN IMAGES, TERMINAL DEVICE, AND COMPUTER READABLE STORAGE MEDIUM APPLYING THE METHOD

(71) Applicant: HON HAI PRECISION INDUSTRY CO., LTD., New Taipei (TW)

(72) Inventors: Chung-Yu Wu, New Taipei (TW); Guo-Chin Sun, New Taipei (TW); Chih-Te Lu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 462 days.

(21) Appl. No.: 17/748,259

(22) Filed: May 19, 2022

(65) Prior Publication Data
US 2023/0169762 A1 Jun. 1, 2023

(30) Foreign Application Priority Data
Nov. 30, 2021 (CN) .......................... 202111441530.6

(51) Int. Cl.
*G06K 9/00* (2022.01)
*G06N 3/045* (2023.01)
(Continued)

(52) U.S. Cl.
CPC ............. *G06V 10/98* (2022.01); *G06N 3/045* (2023.01); *G06V 10/761* (2022.01); *G06V 10/7715* (2022.01); *G06V 10/82* (2022.01)

(58) Field of Classification Search
CPC ................. G06V 10/98; G06V 10/761; G06V 10/7715; G06V 10/82; G06N 3/045; G06N 3/04; G06N 3/08; G06N 3/047; G06N 3/088; G06T 2207/20081; G06T 2207/20084; G06T 2207/30148;
(Continued)

(56) References Cited

U.S. PATENT DOCUMENTS 10,373,023 B1 * 8/2019 Kim .................... G06T 15/10
2021/0042503 A1 * 2/2021 Karras ..................... G06T 7/70

FOREIGN PATENT DOCUMENTS

CN 109493297 A * 3/2019 ............ G06T 5/001
CN 112435221 A 3/2021
(Continued)

*Primary Examiner* — Xin Jia
(74) *Attorney, Agent, or Firm* — ScienBiziP, P.C.

(57) ABSTRACT

A method of optimizing the detection of abnormalities in images of products generates a first image similar to training images and a second image similar to testing images with normal images and the images showing abnormalities inputted into a generative adversarial network (GAN). The GAN determines a first similarity ratio between the first image and the training image and generates a parameter based on the first similarity ratio for adjusting the GAN. A second similarity ratio between the second image and the testing image is determined. The testing image is deemed a normal image when the second similarity ratio is larger than the specified threshold value, and deemed to be an image revealing abnormalities when the second similarity ratio is less than or equal to the specified threshold value. A terminal device and a computer readable storage medium applying the method are also provided.

20 Claims, 5 Drawing Sheets

(51) Int. Cl.
*G06V 10/74* (2022.01)
*G06V 10/77* (2022.01)
*G06V 10/82* (2022.01)
*G06V 10/98* (2022.01)

(58) Field of Classification Search
CPC ......... G06T 2207/30164; G06T 7/0004; G06T 7/001; G06T 7/60; G06T 7/90; G06T 2207/10004; G06T 2207/30108; G06F 18/2433
See application file for complete search history.

(56) References Cited

FOREIGN PATENT DOCUMENTS

| | | | | |
|---|---|---|---|---|
| CN | 113261012 A | * | 8/2021 | ............. G06T 11/00 |
| CN | 113592769 A | | 11/2021 | |

* cited by examiner

METHOD FOR OPTIMIZING DETECTION OF ABNORMALITIES IN IMAGES, TERMINAL DEVICE, AND COMPUTER READABLE STORAGE MEDIUM APPLYING THE METHOD

FIELD

The subject matter herein generally relates to image processing, particularly to detecting abnormalities in images, a method for optimizing detection of abnormalities in images, a detection apparatus, and a storage medium applying the method.

BACKGROUND

During manufacturing of integrated circuit (IC) chips, data processing is an important activity for optimizing a manufacturing process, and detection of abnormalities as a process is used for analyzing data.ABnormal situations detected by the detection process are provided to staff. Image data is one type of data in the detection process for analyzing data. In a related art, the detection process pre-establishes a detection model. The detection model requires a large amount of normal data and a large amount of data revealing abnormalities. The abnormal data is hard to obtain due to a low probability of unqualified products, which makes the detection process hard to achieve.

Thus, there is room for improvement in the art.

BRIEF DESCRIPTION OF THE DRAWINGS

Implementations of the present disclosure will now be described, by way of example only, with reference to the attached figures.

DETAILED DESCRIPTION

To make the objectives, technical solutions, and advantages of the embodiments of the present invention more comprehensible, the following clearly describes the technical solutions in the embodiments of the present invention with reference to the accompanying drawings in the embodiments of the present invention. It needs to be indicated that in case of no conflict, the embodiments of the present application and the features in the embodiments can be combined with one another. The embodiments to be described are merely a part rather than all of the embodiments of the present invention.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

In some scenarios, in an automated production line, each product needs to be photographed and the photograph analyzed, thus checking that appearance of the product matches or is comparable with a certain design. When the appearance of the product is different from the design, the product is an unqualified product. This is method of detecting abnormalities in a related art.

In the scenarios, the method of detecting abnormalities needs to pre-establish a detection model. The detection model requires a large number of normal images and a large number of images showing abnormalities (abnormal images). The abnormal images are hard to obtain due to a low probability of unqualified products, which provides very little guidance for the detection model. Thus, it is hard to achieve the method of effective detection.

Due to the above state, the present disclosure provides a method for optimizing detection of abnormal images. The method decreases a number of the abnormal images, thus a difficulty for detecting unqualified products is reduced.

Figure 1:
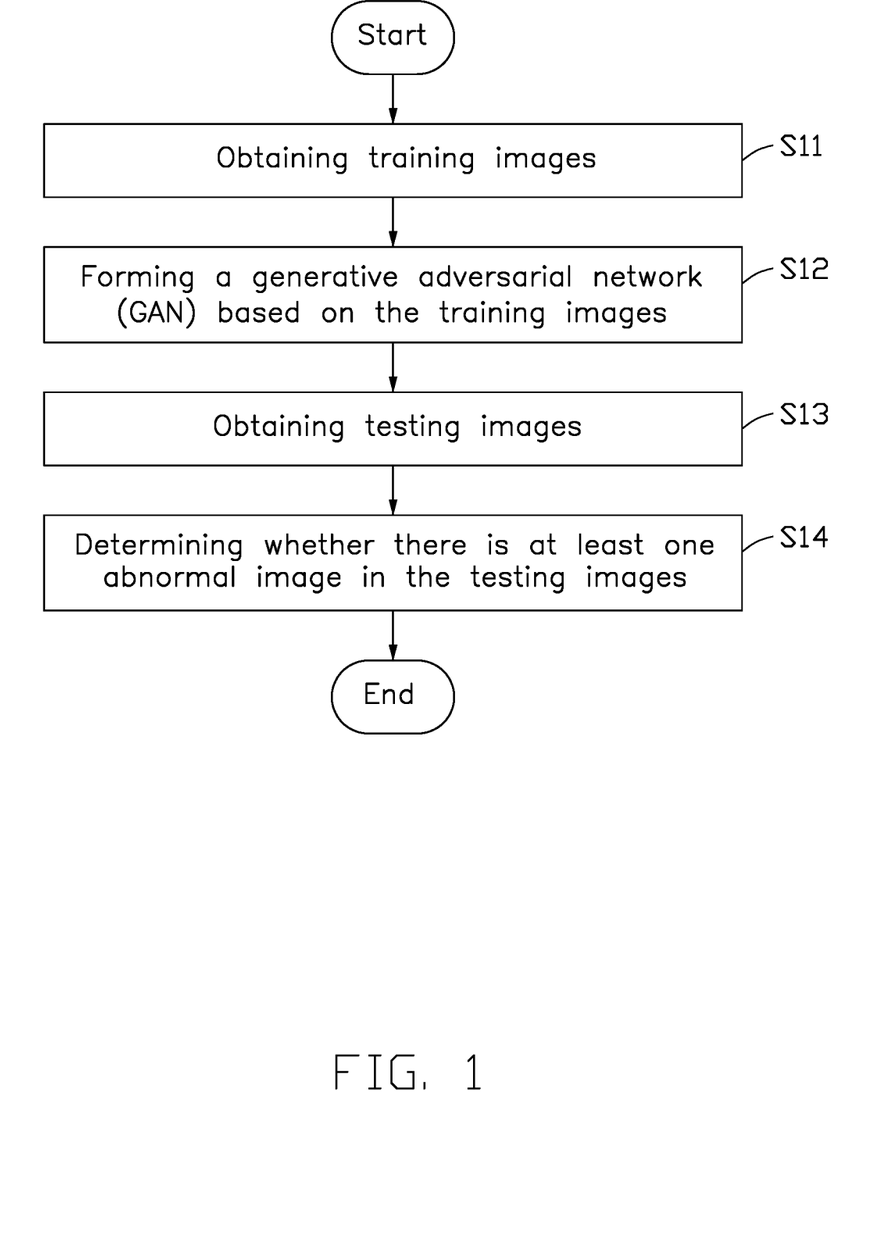
FIG. 1 is a flowchart illustrating an embodiment of a method for optimizing abnormal image detection according to the present disclosure.

FIG. 1 shows a flowchart of an embodiment of a method for optimizing detection. Due to different requirements, a sequence of steps in the flowchart diagram can be changed, and some steps can be omitted. The method includes the following steps, these steps may be re-ordered:

In block S11, training images are obtained, and the training images are normal images with no defects revealed.

Each training image also can be an appearance of the product in an image, which needs to be detected. For example, the training images can be images of plastic casings. When the appearance in the image meets a design with no defects, such as scratches, gaps, and dents, the training image is considered as the normal image. When the appearance in the image includes at least one defect, the training image is considered as abnormal image.

The training images are obtained by an image capture device, such as a video camera, or a surveillance camera.

In block S12, a generative adversarial network (GAN) is formed based on the training images.

The GAN may be an unsupervised deep learning model. The GAN may firstly generate several images (first images) related to the training image, which are similar to the training images. A ratio of similarities (first similarity ratio) between the first image and the training image is determined.

In some embodiments, both the training images and the first images can be the appearances of the product in images, outline and shape of the product in the first images are similar to those in the training images.

In some embodiments, based on an unsupervised learning feature, the GAN is trained. An ability of distinguishing differences between the training image and the first image and an ability of generating first images similar to the training images are improved. The trained GAN serves as a detection model for detecting defects of the product.

In some embodiments, the ability of generating the first images and an ability of determining the first similarity ratio are separately trained in order.

Figure 2:
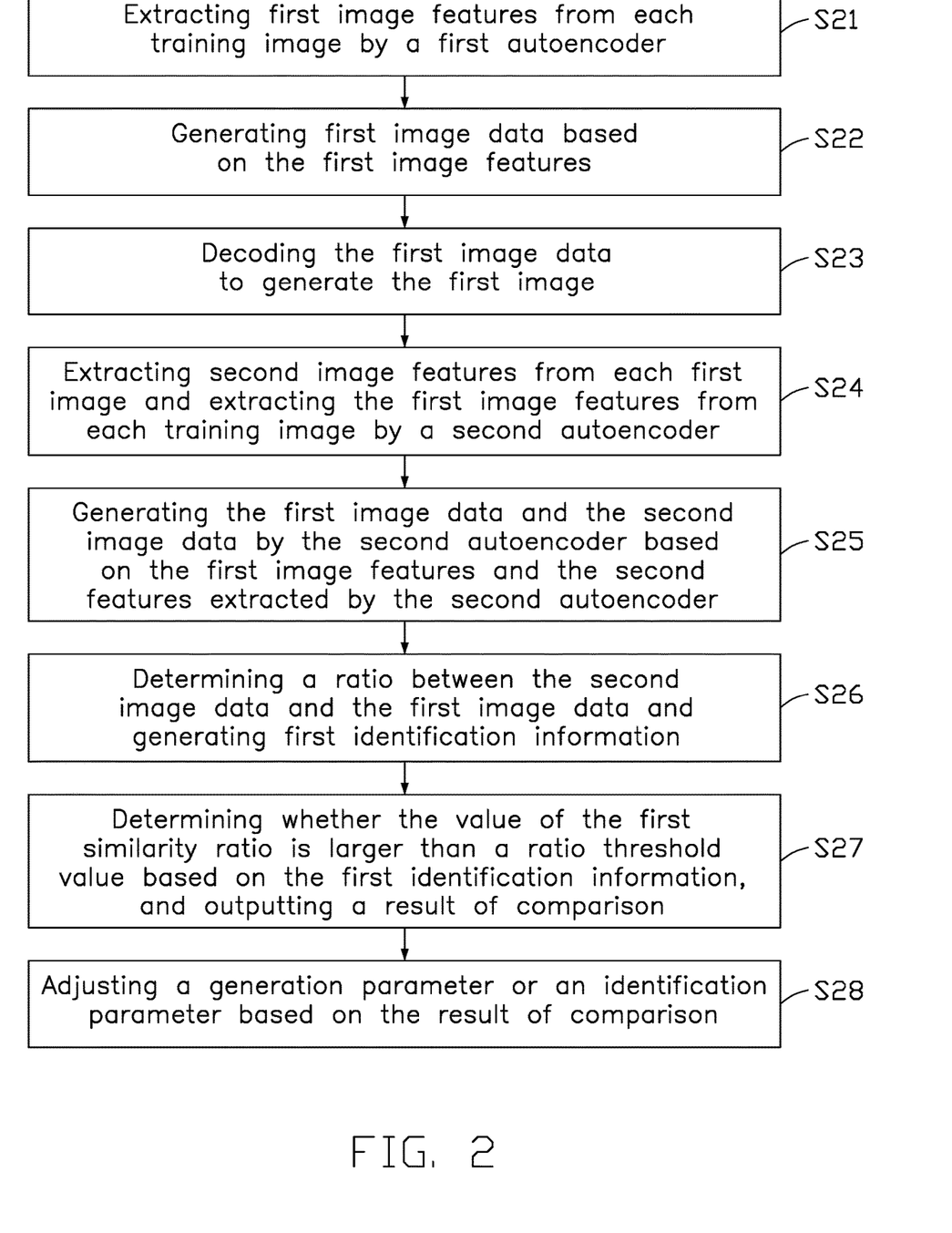
FIG. 2 is a detailed flowchart illustrating an embodiment of the block S12 in FIG. 1 according to the present disclosure.

FIG. 2 shows a detail flowchart of the block S12.

Figure 4:
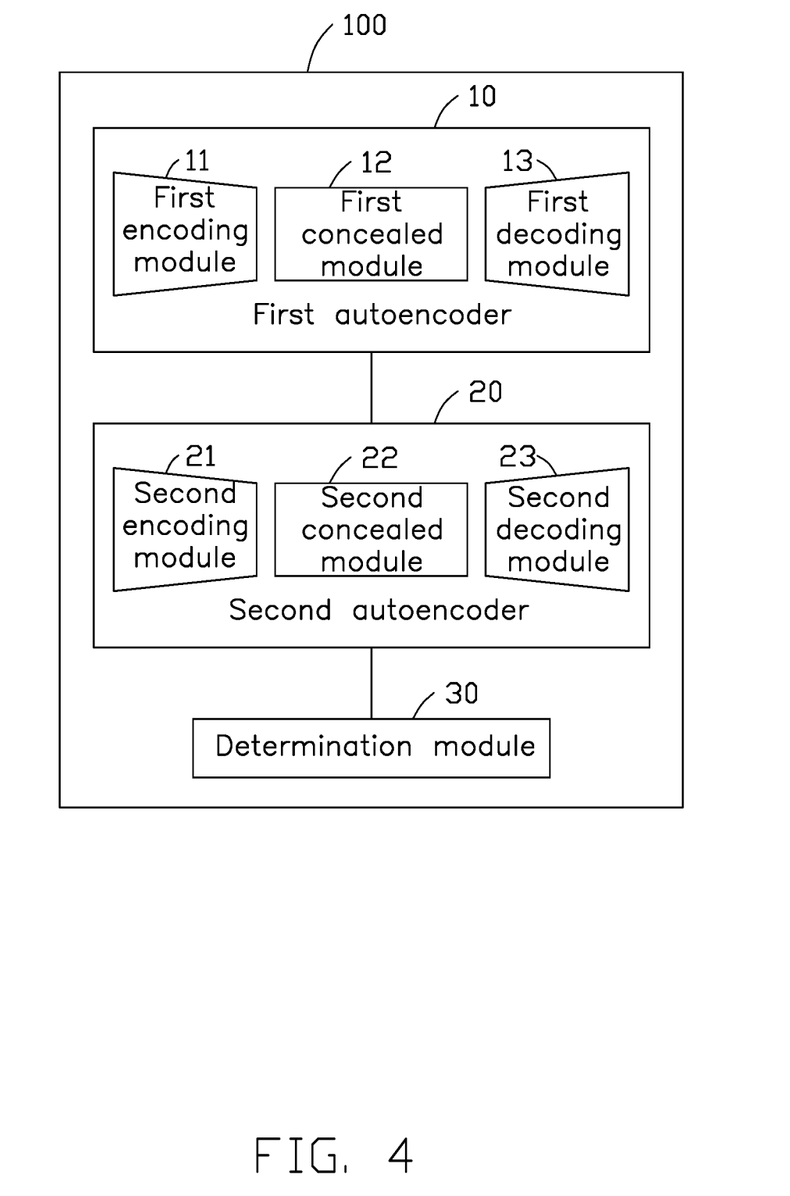
FIG. 4 is a diagram illustrating an embodiment of a detection system according to the present disclosure.

In block S21, first image features are extracted from each training image by a first autoencoder 10 (as shown in FIG. 4).

When the training image is the appearance of the product in an image, the first image features are important and significant features in the appearance of the product in an image, such as outline, shape, surface openings, surface dents on the product, and so on.

For generating the first image having a high similarity ratio with the training image, the first image features serve as a basis for generating the first image.

In block S22, first image data is generated based on the first image features.

When several first image features are extracted from one training image, each first image data corresponds to one first image feature.

In block S23, the first image data is decoded to generate the first image.

After the first image data is decoded, the first image features corresponding to the first image data are presented on the first image. The important features appearing in the image of the product in the training image are presented on the first image for making the first image similar to the training image.

For example, the training image can be the appearance of the product in an image, the first image also can be the appearance of the same product in an image. The features of the product in the first image, such as the outline, the shape, the surface openings, and the surface dents, are similar to those in the training image.

Each training image corresponds to one first image.

In block S24, second image features are extracted from each first image and the first image features are extracted from each training image by a second autoencoder 20 (as shown in FIG. 4).

The first image can be the appearance of the product in an image, and the second image features can be the important and significant features in appearance of the product in an image, such as outline, shape, surface openings, or surface dents on the product, and so on.

After generating the first image, the first image serves as an input item, and the second image features are extracted from the first image. A ratio of the same image features appearing between the second image features and the first image features is obtained by comparing the first image features and the second image features, and serves as the first similarity ratio.

For example, the first image and the training image are the appearances of the same product in images, and the surface of the product defines a plurality of circular holes. The positions, shapes, and number of the circular holes in the first image and the training image serves as the first image features and the second image features. The ratio of the same image features, such as the respective positions of the circular holes, between the second image features and the first image features serves as the first similarity ratio.

In block S25, the first image data and the second image data are generated by the second autoencoder 20 based on the first image features and the second features extracted by the second autoencoder 20.

The first image data corresponds to the first image features, and the second image data corresponds to the second image features. A ratio of same image data between the second image data and the first image data is obtained by comparing the first image data and the second image data, and this can also serve as the first similarity ratio, which is similar to the ratio of the same image features between the second image features and the first image features.

In block S26, a ratio between the second image data and the first image data is determined and first identification information is generated.

In some embodiments, the first identification information can be a value of the first similarity ratio. In other embodiment, the first identification information can be a pure color image.

For example, when the first similarity ratio reaches a first ratio, the first identification information can be a pure black image. When the first similarity ratio reaches a second ratio, which is less than the first ratio, the first identification information can be a pure white image. When the first similarity ratio is found between the first ratio and the second ratio, the first identification information can be a pure gray image. The higher the first similarity ratio is, the deeper (that is, the darker) is the color of the pure image. In one embodiment, the first ratio can be 100%, and the second ratio can be zero.

In block S27, determining whether the value of the first similarity ratio is larger than a ratio threshold value based on the first identification information, and a result of comparison is outputted.

For example, the ratio threshold value can be 90%, and when the value of the first similarity ratio is larger than 90%, the first image and the training image are the same. When the value of the first similarity ratio is less than or equal to 90%, the first image and the training image can be different images, that is, showing differences in appearance.

In block S28, a generation parameter or an identification parameter is adjusted based on the comparison.

The generation parameter is related to the ability of generating the first images, and the identification parameter is related to the ability of determining the first similarity ratio. When training the ability of generating the first image to be similar to the training image, the generation parameter is adjusted based on the first identification information. When training the ability of determining the first similarity ratio, the identification parameter is adjusted based on the first identification information.

For example, for training the first image, when the value of the first similarity ratio is less than or equal to the ratio threshold value, the generation parameter needs to be adjusted for increasing the first similarity ratio. For training the first similarity ratio, when the value of the first similarity ratio is larger than the ratio threshold value, the identification parameter needs to be adjusted for improving an identification ability between the first image and the training image.

For example, the generation parameter can be weighting parameter of each first image data, while generating the first image based on the first image data. The identification parameter can be weighting parameter of the ratio of same data between the second image data and the first image data, which forms the first identification information, while comparing the first image data and the second image data.

While training the GAN, the ability of generating the first images and the ability of determining the first similarity ratio are separately trained. While training the ability of generating the first images, the first similarity ratio is used for determining whether the first image is very similar to the training image. While training the ability of determining the first similarity ratio, the first image having a high similarity with the training image is used as training data, for improving an extracting ability of the second image features and an identification ability of comparing the first image data and the second image data.

In one embodiment, the GAN is being trained for multiple times using several testing images. For one training process, one testing image is used as the training data. The one testing image can serve as the training data for one occasion or for several times while training the GAN. During each training process of the GAN, the generation parameter or the identification parameter is adjusted.

In one embodiment, the generation parameter and the identification parameter can be manually adjusted. In another embodiment, the generation parameter and the identification parameter can be automatically adjusted based on the features of the unsupervised learning of the GAN.

The trained GAN may generate the first image to be similar to the training image when inputting any image, and has a 50% probability for distinguishing the first image to be different from the training image. Thus, two abilities of the GAN are in a balanced state.

In block S13, testing images are obtained. The testing images include normal images and abnormal images.

The same object can be captured in images for use in training images and for use in testing images, such as both the training images and the testing images show an appearance of the same product in images.

The testing images obtained by the image capture device are real-time images. For example, the image capture device disposed on an automatic production line captures the image of the finished product as the testing image, and each testing image is detected at that time for determining whether the testing image is the normal image or the abnormal image. When the testing image is the abnormal image, a labeling apparatus on the automatic production line labels the abnormal image accordingly. The labeled products can be gathered by workers while operating the automatic production line.

The testing images are all the images of the product on the automatic production line captured at several specified times by the image capture device. By capturing testing images by the image capture device over a time duration, the testing images are batch detected. Detecting results of the testing images are statistical to obtain a number of unqualified products in a constant number of the products, thus a defects rate of constant number of the products in the constant number is calculated.

In block S14, determining whether there is at least one abnormal image in the testing images.

Figure 3:
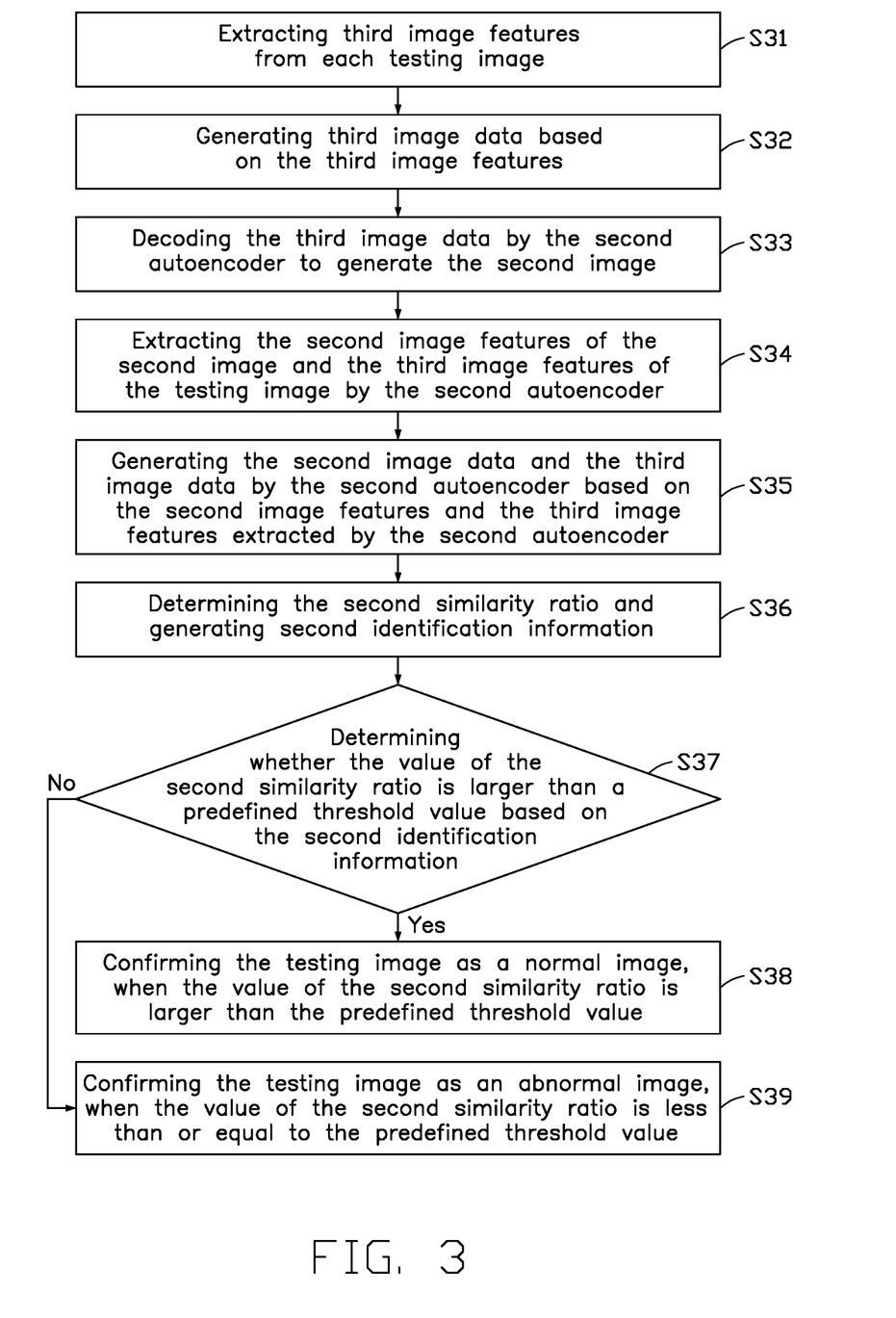
FIG. 3 is a detailed flowchart illustrating an embodiment of the block S14 in FIG. 1 according to the present disclosure.

FIG. 3 shows a detail flowchart of the block S14.

In block S31, third image features are extracted from each testing image.

For example, the third image features can be important or significant features in the appearances of the product in images, such as outline, shape, surface openings, or surface dents on the product, and so on.

For generating a second image having a high similarity ratio with the testing image, the third image features serve as a basis for generating the second image.

In block S32, third image data is generated based on the third image features.

When several third image features are extracted from a same testing image, each third image data corresponds to one third image feature.

In block S33, the third image data is decoded by the first autoencoder to generate the second image.

After the third image data is decoded, the third image features corresponding to the third image data are presented on the second image. The important features of the product appearing in the testing image are presented on the second image for making the second images similar to the testing image.

In one embodiment, during the detection of the testing image, the objects captured in the testing images and the training images are same, thus the normal images in the testing images are same as the training images, and there are differences between the abnormal image in the testing images and the training images. The second image outputted by the trained GAN is very similar to the normal image, and are also different from the abnormal image, whether the testing image inputted into the trained GAN is the normal image or the abnormal image.

For example, when the testing image is the appearance of the product in an image, the second image also can be the appearance of the same product in an image. The features of the product in the second image, such as the outline, the shape, the surface openings, and the surface dents, are similar to those specified in the design.

Each testing image corresponds to one second image.

In block S34, the second image features of the second image and the third image features of the testing image are extracted by the second autoencoder.

After generating the second image, the second image serves as an input item, and the second image features are extracted from the second image. A ratio of the same image features between the third image features and the second image features is obtained by comparing the second image features and the third image features, and serves as a second similarity ratio between the second image and the testing image.

For example, the second image and the testing image are the appearances of the same product in images, and the surface of the product defines a plurality of circular holes. The ratio of the same image features, such as the positions of the circular holes, between the third image features and the second image features serves as the second similarity ratio.

In block S35, the second image data and the third image data are generated by the second autoencoder 20 based on the second image features and the third image features extracted by the second autoencoder 20.

The second image data corresponds to the second image features, and the third image data corresponds to the third image features. A ratio of same image data between the third image data and the second image data is obtained by comparing the second image data and the third image data, and also serves as the second similarity ratio, which is similar to the ratio of the same image features between the third image features and the second image features.

In block S36, the second similarity ratio is determined and second identification information is generated.

In some embodiments, the second identification information can be a value of the second similarity ratio. In other embodiment, the second identification information can be a color pure image.

For example, when the second similarity ratio reaches a first predefined ratio, the second identification information can be a pure black image. When the second similarity ratio reaches a second predefined ratio, which is less than the first predefined ratio, the second identification information can be a pure white image. When the second similarity ratio is between the first specified ratio and the second specified ratio, the first identification information can be a pure gray image. The higher the second similarity ratio is, the deeper (that is, the darker) is the color of the pure image. In one embodiment, the first predefined ratio can be 100%, and the second predefined ratio can be zero.

In block S37, whether the value of the second similarity ratio is larger than a predefined threshold value based on the second identification information is determined.

In one embodiment, when the testing image is an abnormal image, a difference between the second image and the testing image can be identified, which causes the value of the second similarity ratio to be less than the predefined threshold value. Thus, the second similarity ratio is confirmed by the second identification information, and then the determination between the value of the second similarity ratio and the predefined threshold value is applied for determining whether the testing image is an abnormal image.

In block S38, the testing image is confirmed as a normal image when the value of the second similarity ratio is larger than the predefined threshold value.

In block S39, the testing image is confirmed as an abnormal image when the value of the second similarity ratio is less than or equal to the predefined threshold value.

For example, the predefined threshold value can be 90%, and when the value of the second similarity ratio is larger than 90%, the testing image is deemed a normal image. When the value of the second similarity ratio is less than or equal to 90%, the testing image is deemed to be an abnormal image.

FIG. 4 shows a detection system 100. The detection system 100 includes a first encoding module 11, a first concealed space 12, a first decoding module 13, a second encoding module 21, a second concealed space 22, a second decoding module 13, and a determination module 30.

The first encoding module 11 is configured to receive the training images, extract the first image features from each training image, and output first image data corresponding to the first image features to the first concealed space 12.

In one embodiment, the first encoding module 11 also receives the testing images, extracts third image features from each testing image, and outputs the third image data corresponding to the third image features to the first concealed space 12.

The first concealed space 12 is configured to latch the first image data.

In one embodiment, the first concealed space also latches the third image data.

The first decoding module 13 is configured to obtain the first image data, decode the first image data, and output the second image based on the decoded first image data to the second encoding module 21.

In one embodiment, the first decoding module 13 also obtains the third image data, decodes the third image data, and outputs the second image based on the decoded third image data to the second encoding module 21.

The second encoding module 21 is configured to extract the second image features of each first image related to the training image, output second image data corresponding to the second image features to the second concealed space 22, receive the training images, extract the first image features of each training image, and output first image data corresponding to the first image features to the second concealed space 22.

In one embodiment, the second encoding module 21 also receives the testing image, extracts the third image features, and outputs third image data corresponding to the third image features to the second concealed space 22.

The second concealed space 22 is configured to latch the first and second image data.

In one embodiment, the second concealed space 22 also latches the third image data.

The second decoding module 23 is configured to obtain the first and second image data, determine the first similarity ratio, and output the first identification information.

In one embodiment, the second decoding module 23 also obtains the second and third image data, determines the second similarity ratio, and outputs the second identification information.

The first encoding module 11, the first concealed space 12, and the first decoding module 13 form the first autoencoder 10. The second encoding module 21, the second concealed space 22, and the third decoding module 23 form the second autoencoder 20. The first autoencoder 10 and the second autoencoder 20 are artificial neural networks (ANNs) uses in unsupervised learning. The first autoencoder 10 and the second autoencoder 20 can form the GAN.

The determination module 30 is configured to determine the first similarity ratio based on the first identification information, determine whether the value of the first similarity ratio is larger than the ratio threshold value, and output the result of comparison. When the value of the first similarity ratio is larger than the ratio threshold value, the training image and the first image are the same, when value of the first similarity ratio is less than or equal to the ratio threshold value, the training image and the first image are different.

In one embodiment, the determination module 30 further determines the second similarity ratio based on the second identification information, and determines whether the value of the second similarity ratio is larger than the predefined threshold value. When the value of the second similarity ratio is larger than the predefined threshold value, the testing image is deemed a normal image, when the value of the second similarity ratio is less than or equal to the predefined threshold value, the testing image is deemed an abnormal image.

In one embodiment, operation of each module references the method shown in FIGS. 1-3.

The detection system 100 uses the normal images as data merely to form the GAN, and the GAN may detect abnormal images. A difficulty of detecting abnormal images is reduced.

Figure 5:
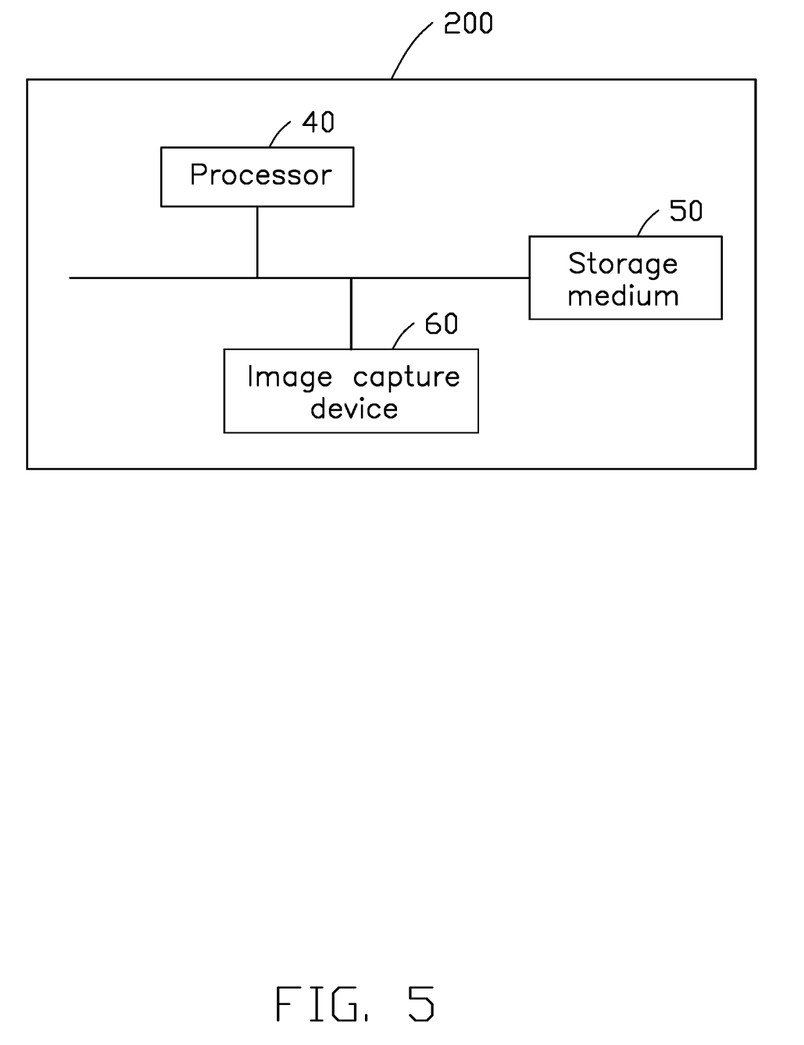
FIG. 5 is a diagram illustrating an embodiment of a terminal device according to the present disclosure.

FIG. 5 shows a terminal device 200.

In one embodiment, the terminal device 200 can include the detection system 100 as shown in FIG. 4.

The terminal device 200 includes a processor 40, a storage medium 50, and an image capture device 60, which are connected with each other through a bus, or directly connected. For example, the processor 40, the storage medium 50, and the image capture device 60 communicates with each other through a cable or a short distance wireless communication manner, such as BLUETOOTH or local area network (LAN), but is not limited.

The processor 40 can be a universal central processing unit (CPU), a microprocessor, an application-specific integrated circuit (application-specific integrated circuit, ASIC), or one or more integrated circuits configured to control execution of programs in solutions of the present disclosure.

The storage medium 50 can be one or more memories which may be a read-only memory (ROM) or a static storage device of another type which can store static information and instructions, a random access memory (RAM) or a dynamic storage device of another type which can store information and instructions, or may also be an electrically erasable programmable read-only memory (EEPROM), a compact disc read-only memory (CD-ROM) or other optical disc memories, optical disc memories (including a compact disc, a laser disc, an optical disc, a digital versatile disc, a Blu-ray disc, and the like), a magnetic disk storage medium or other magnetic storage devices, or any other medium which can be used for carrying or storing expected program code in an instruction or data structure form and can be accessed by a computer, but is not limited thereto. The storage medium 50 can be an independent component, and also can be embedded with the processor 40.

The image capture device 60 is an electronic device having an image capturing function, and is configured to capture images for testing and for training. The image capture device 60 can be a video camera or a surveillance camera, but is not limited.

The present disclosure also provides a computer readable storage medium. The computer readable storage medium includes computer instructions. When the computer instructions are run on the terminal device 200, the terminal device 200 implements the method for optimizing the detection of abnormalities in images.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the market place, or to enable others of ordinary skill in the art to understand the embodiments disclosed herein.

What is claimed is:

1. A method for optimizing detection of abnormalities in images used in a terminal device, the terminal device comprises a storage medium and a processor; wherein the storage medium stores computer programs, and the processor executes the computer programs to implement the following steps:
forming a generative adversarial network (GAN) based on training images; wherein the training images are normal images; the GAN generates a first image similar to the training image, confirms a first similarity ratio between the first image and the training image, and generates a generation parameter of the GAN or an identification parameter of the GAN based on the first similarity ratio between the first image and the training image for training the GAN;
obtaining testing images; wherein the testing images comprises the normal images and abnormal images;
determining a second similarity ratio between second image corresponding to the testing image generated by the trained GAN and the testing image;
determining whether the second similarity ratio is larger than a specified threshold value;
confirming the testing image as a normal image when the second similarity ratio is larger than the specified threshold value; and
confirming the testing image as an abnormal image when the second similarity ratio is less than or equal to the specified threshold value.

2. The method of claim 1, wherein the step of generating a generative adversarial network (GAN) based on training images comprises:
extracting first image features from each training image by a first autoencoder;
generating the first image based on the first image features;
extracting second image features from each first image by a second autoencoder;
determining a ratio between the second image features and the first image features and generating a first identification information; and
adjusting the generation parameter or the identification parameter based on the first identification information.

3. The method of claim 2, wherein the step of generating the generated image based on the first image features further comprises:
generating first image data based on the first image features; and
decoding the first image data to generate the first image.

4. The method of claim 3, wherein the step of determining the ratio between the second image features and the first image features and generating a first identification information comprises:
generating second image data based on the second image features; and
determining the ratio between the second image features and the first image features and generating the first identification information.

5. The method of claim 4, wherein the step of determining the ratio between the second image features and the first image features and generating a first identification information comprises:
determining the ratio between the second image data and the first image data;
outputting a pure black image when the ratio between the second image data and the first image data reaches a first ratio;
outputting a pure white image when the ratio between the second image data and the first image data reaches a second ratio; and
outputting a gray image when the ratio between the second image data and the first image data is between the first predefined ratio and the second predefined ratio; a color depth of the gray image is proportional to the ratio between the second image data and the first image data.

6. The method of claim 2, wherein the step of adjusting the generation parameter or the identification parameter based on the first identification information comprise:
determining whether the value of the first similarity ratio is larger than a ratio threshold value based on the first identification information, and outputting a result of comparison; and
adjusting the generation parameter or the identification parameter based on the result of comparison.

7. The method of claim 1, wherein the step of determining whether the value of the second similarity ratio is larger than a specified threshold value comprises:
extracting third image features from each testing image by a first autoencoder;
generating the second image based on the third image features; and
extracting the second image features from each second image by a second autoencoder;

determining a ratio between the third image features and the second image features and generating a second identification information; and determining whether the second similarity ratio is larger than the predefined threshold value based on the second identification information.

8. The method of claim 7, wherein the step of generating the second image based on the third image features comprises:

generating third image data based on the third image features; and decoding the third image data to generate the second image.

9. The method of claim 8, wherein the step of determining the ratio between the third image features and the second image features and generating a second identification information comprises:

generating third image data based on the third image features; and determining the ratio between the third image features and the second image features and generating the second identification information.

10. The method of claim 9, wherein the step of determining the ratio between the third image data and the second image data and generating the second identification information comprises:

determining the ratio between the third image data and the second image data;

outputting a pure black image when the ratio between the third image data and the second image data reaches a first predefined ratio;

outputting a pure white image when the ratio between the third image data and the second image data reaches a second predefined ratio; and outputting a gray image when the ratio between the third image data and the second image data is between the first predefined ratio and the second predefined ratio; a color depth of the gray image is proportional to the ratio between the third image data and the second image data.

11. A terminal device comprises:

a storage medium; and a processor, wherein the storage medium stores computer programs, and the processor executes the computer programs to implement the following:

forming a generative adversarial network (GAN) based on training images; wherein the training images are normal images; the GAN generates a first image similar to the training image, confirms a first similarity ratio between the first image and the training image, and generates a generation parameter of the GAN or an identification parameter of the GAN based on the first similarity ratio between the first image and the training image for training the GAN;

obtaining testing images; wherein the testing images comprises the normal images and abnormal images;

determining a second similarity ratio between second image corresponding to the testing image generated by the trained GAN and the testing image;

determining whether the second similarity ratio is larger than a specified threshold value;

confirming the testing image as a normal image when the second similarity ratio is larger than the specified threshold value; and confirming the testing image as an abnormal image when the second similarity ratio is less than or equal to the specified threshold value.

12. The terminal device of claim 11, wherein the processor further:

extracting first image features from each training image by a first autoencoder;

generating first image data based on the first image features;

extracting second image features from each first image by a second autoencoder;

generating second image data based on the second image features;

determining a ratio between the second image features and the first image features and generating a first identification information; and adjusting the generation parameter or the identification parameter based on the first identification information.

13. The terminal device of claim 12, wherein the processor further:

decoding the first image data to generate the first image.

14. The terminal device of claim 12, wherein the processor further:

determining whether the value of the first similarity ratio is larger than a ratio threshold value based on the first identification information, and outputting a result of comparison; and adjusting the generation parameter or the identification parameter based on the result of comparison.

15. The terminal device of claim 12, wherein the processor further:

determining the ratio between the second image data and the first image data;

outputting a pure black image when the ratio between the second image data and the first image data reaches a first ratio;

outputting a pure white image when the ratio between the second image data and the first image data reaches a second ratio; and outputting a gray image when the ratio between the second image data and the first image data is between the first predefined ratio and the second predefined ratio; a color depth of the gray image is proportional to the ratio between the second image data and the first image data.

16. The terminal device of claim 11 wherein the processor further:

extracting third image features from each testing image by a first autoencoder;

generating the second image based on the third image features; and extracting the second image features from each second image by a second autoencoder;

determining a ratio between the third image features and the second image features and generating a second identification information; and determining whether the second similarity ratio is larger than the predefined threshold value based on the second identification information.

17. The terminal device of claim 16, wherein the processor further:

generating third image data based on the third image features; and decoding the third image data to generate the second image.

18. The terminal device of claim 17, wherein the processor further:
   generating third image data based on the third image features; and
   determining the ratio between the third image features and the second image features and generating the second identification information.

19. The terminal device of claim 18, wherein the processor further:
   determining the ratio between the third image data and the second image data;
   outputting a pure black image when the ratio between the third image data and the second image data reaches a first predefined ratio;
   outputting a pure white image when the ratio between the third image data and the second image data reaches a second predefined ratio; and
   outputting a gray image when the ratio between the third image data and the second image data is between the first predefined ratio and the second predefined ratio; a color depth of the gray image is proportional to the ratio between the third image data and the second image data.

20. A computer readable storage medium, the computer readable storage medium stores computer programs, and the computer programs are executed by at least one processor to implement the following steps:
   forming a generative adversarial network (GAN) based on training images; wherein the training images are normal images; the GAN generates a first image similar to the training image, confirms a first similarity ratio between the first image and the training image, and generates a generation parameter of the GAN or an identification parameter of the GAN based on the first similarity ratio between the first image and the training image for training the GAN;
   obtaining testing images; wherein the testing images comprises the normal images and abnormal images;
   determining a second similarity ratio between second image corresponding to the testing image generated by the trained GAN and the testing image;
   determining whether the second similarity ratio is larger than a specified threshold value;
   confirming the testing image as a normal image when the second similarity ratio is larger than the specified threshold value; and
   confirming the testing image as an abnormal image when the second similarity ratio is less than or equal to the specified threshold value.

\* \* \* \* \*